United States Patent [19]

Schröder et al.

[11] Patent Number: 4,856,917
[45] Date of Patent: Aug. 15, 1989

[54] DEVICE FOR THE SYNCHRONOUS GUIDANCE OF A ROLLER BEARING CAGE FOR A ROLLER BEARING EXECUTING SWIVEL MOTION

[75] Inventors: Horst Schröder; Klaus Kispert; Robert Stolz, all of Schweinfurt; Werner Jacob, Frankfurt am Main, all of Fed. Rep. of Germany

[73] Assignee: SKF GmbH, Schweinfurt, Fed. Rep. of Germany

[21] Appl. No.: 263,616

[22] Filed: Oct. 27, 1988

[30] Foreign Application Priority Data

Nov. 4, 1987 [DE] Fed. Rep. of Germany ....... 3737387

[51] Int. Cl.$^4$ .................. F16C 19/50; F16C 32/00; F01B 13/04
[52] U.S. Cl. ..................... 384/550; 91/505; 92/12.2; 384/2
[58] Field of Search .............. 384/2, 154-156, 384/445, 451, 548, 550, 572-580, 625; 91/503-506; 92/12.2

[56] References Cited

U.S. PATENT DOCUMENTS

| | | | |
|---|---|---|---|
| 3,396,670 | 8/1968 | Baits | 91/506 |
| 4,029,367 | 6/1977 | Schwede et al. | 384/2 |
| 4,584,926 | 4/1986 | Beck, Jr. et al. | 91/505 X |
| 4,618,271 | 10/1986 | Li | 384/550 X |
| 4,627,330 | 12/1986 | Beck, Jr. | 384/576 X |

FOREIGN PATENT DOCUMENTS

| | | | |
|---|---|---|---|
| 2730408 | 1/1979 | Fed. Rep. of Germany | 384/584 |
| 3442391 | 1/1986 | Fed. Rep. of Germany | 92/12.2 |
| 3610914 | 1/1987 | Fed. Rep. of Germany | 91/505 |

*Primary Examiner*—Thomas R. Hannon
*Attorney, Agent, or Firm*—Rosen, Dainow & Jacobs

[57] ABSTRACT

The invention concerns a device for synchronous guiding a roller bearing cage for a roller bearing performing swivel motions, the device comprising a roller cage and bearing parts which swivel relative to one another, the roller cage provided with a pinion gear formed on two diametrically opposed sites with curved toothed segments having different pitch circle diameters, the toothed segments meshing with the teeth of the bearing parts.

5 Claims, 1 Drawing Sheet

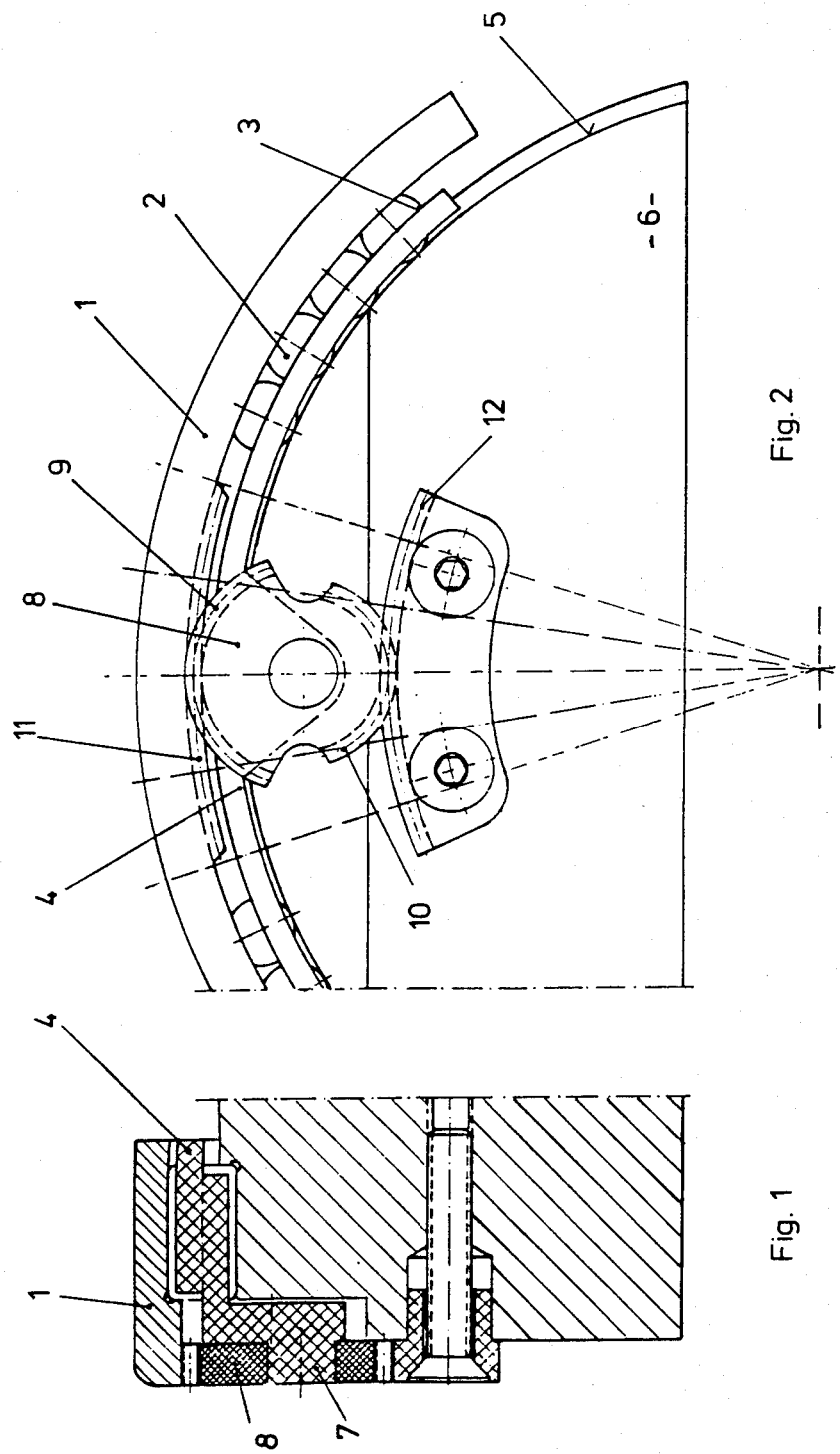

DEVICE FOR THE SYNCHRONOUS GUIDANCE OF A ROLLER BEARING CAGE FOR A ROLLER BEARING EXECUTING SWIVEL MOTION

BACKGROUND OF THE INVENTION

1. Field of the Invention

The invention concerns a device for synchronously guiding a roller bearing cage for a roller bearing performing a swivel motion. Such roller bearings are used, for example, as swash plate roller bearings for hydraulic axial piston machines. Other applications are also possible.

2. Description of the Prior Art

A swash plate roller bearing for a hydraulic piston machine is disclosed in DE-PS No. 16 53 617. In this disclosure, the rollers are contained in a curved cage between the cylindrical bearing surface of the swash plate and the hollow cylindrical bearing surface of the machine housing, whereby the cage is equipped with a pinion gear for the forced guidance of the cage. The pinion gear meshes with a toothed segment connected to the machine housing and with another toothed segment connected to the swash plate.

In this known embodiment the pinion gear is provided over its full perimeter with teeth having the same pitch circle diameter. This means that for a precise result, i.e., for a pure rolling motion, the reference diameter of the pinion gear must be the same as the diameter of the rollers. However, in order to provide a total number of teeth of normal size for the pinion gear, DE-PS No. 16 53 617 teaches compensating for the difference between the pitch circle diameter of the pinion gear and the roller surface area by offsetting the shaft of the pinion gear radially inward relative to the roller shaft. Since application of this measure in the known embodiment does not fully prevent creeping, i.e., sliding, the toothed segments are, in addition, attached in a flexible manner to permit some lateral motion by the toothed segments.

SUMMARY AND OBJECTS OF THE INVENTION

The objective of the invention is to obtain in a simple manner, and without additional flexible fastening elements for the toothed elements, a synchronous guidance of the cage.

The objective is met according to this invention by forming the pinion gear on two diametrically opposed sites with curved toothed segments having different pitch circle diameters.

In this manner, the reference diameters of both toothed segments of the pinion gear—each of which mesh with the teeth of bearing parts which swivel relative to one another—can be calculated so precisely and be designed in such a manner in accordance with the location of the shaft of the pinion gear relative to the roller shaft and the diameter of the rollers, that a perfect motion free of sliding or creeping is obtained.

According to a further feature of the invention, the pinion gear may be made of a synthetic material through injection molding, or of metal through precision stamping or sintering, and may be rotatably mounted, for example, on a journal constituting one unit with the cage.

BRIEF DESCRIPTION OF THE DRAWINGS

Further objects and advantages of the invention will appear from the following description as well as from the accompanying drawings which illustrate various embodiments of the invention. It will be understood that the invention is not limited to the embodiments described and that the drawings are for purposes of illustration only and are not intended as a definition of the limits of the invention. Similar reference numerals refer to similar elements throughout the several views.

FIG. 1 is a longitudinal sectional view of a roller bearing executing swivel motion;

FIG. 2 is a partial top view of the roller bearing according to FIG. 1.

DETAILED DESCRIPTION OF PREFERRED EMBODIMENTS

The roller bearing shown in FIGS. 1 and 2 consists of an outer ring segment 1 and a cage 4 holding the rollers 2 in the pockets 3. The rollers 2 roll on the surface area 5 of a bearing part 6 forming the inner race of, e.g., a swash plate for an axial piston pump. A journal 7 is equipped on one of the front sides of the cage 4 with a rotatable pinion gear 8. Curved toothed segments 9 and 10 having different pitch circle diameters are provided on two diametrically opposite sites of the pinion gear. The toothed segments 9 and 10 mesh with the toothed segment 11 of the outer ring segment 1 and the toothed segment 12 of the bearing part 6. In this embodiment the toothed segment 11 is integrally formed with the outer ring segment 1. This is achieved, for example, by a tumbling process or by similar molding process.

When the outer ring segment 1 moves relative to the bearing part 6, the rollers 2 will roll in the corresponding races, thereby pushing the cage 4 from its original position. At the same time, the teeth of the toothed segments 9 and 10 of the pinion gear 8 are in rolling contact with the corresponding toothed segments 11 and 12, so that a precise displacement of the cage and a precise rolling motion of the rollers is achieved.

While the invention has been described in connection with preferred embodiments, this is not meant to be limiting, and it will be obvious to those skilled in the art that many changes and modifications are possible based on the principles described herein and are intended to be covered by the scope of the appended claims.

What is claimed is:

1. An arrangement for synchronously guiding a roller bearing cage for a roller bearing performing a swivel motion, said arrangement comprising a roller cage and bearing parts having teeth and which swivel relative to one another, said roller cage provided with a pinion gear being provided on two diametrically opposed sites with curved toothed segments each having different pitch circle diameters with respect to the other, said toothed segments meshing with the teeth of said bearing parts.

2. A device according to claim 1 wherein the pinion gear is made of a synthetic material.

3. A device according to claim 1 wherein the pinion gear is made of metal by a precision stamping process.

4. A device according to claim 3 wherein the pinion gear is made of metal by a sintering process.

5. A roller bearing according to one of claims 1 to 4 wherein said pinion gear may be rotatably mounted on a journal integrally formed with the cage.

* * * * *